(12) United States Patent
Narita (10) Patent No.: US 9,266,422 B2
(45) Date of Patent: Feb. 23, 2016

(54) SUPPORTING STRUCTURE FOR COOLING WATER RESERVE TANK OF VEHICLE

(75) Inventor: Ayumu Narita, Shizuoka-Ken (JP)

(73) Assignee: SUZUKI MOTOR CORPORATION, Hamamatsu-shi, Shizuoka-ken (JP)

( * ) Notice: Subject to any disclaimer, the term of this patent is extended or adjusted under 35 U.S.C. 154(b) by 144 days.

(21) Appl. No.: 13/812,389

(22) PCT Filed: Jul. 26, 2011

(86) PCT No.: PCT/JP2011/066901
§ 371 (c)(1),
(2), (4) Date: Jan. 25, 2013

(87) PCT Pub. No.: WO2012/014863
PCT Pub. Date: Feb. 2, 2012

(65) Prior Publication Data
US 2013/0112842 A1 May 9, 2013

(30) Foreign Application Priority Data
Jul. 28, 2010 (JP) .................................. 2010-169221

(51) Int. Cl.
*B60K 11/02* (2006.01)
*B60K 5/12* (2006.01)
*F02B 77/13* (2006.01)
*F01P 11/02* (2006.01)

(52) U.S. Cl.
CPC ............. *B60K 11/02* (2013.01); *B60K 5/1208* (2013.01); *F02B 77/13* (2013.01); *B60K 5/1216* (2013.01); *F01P 11/02* (2013.01)

(58) Field of Classification Search
CPC ...... B60K 11/02; B60K 11/04; B60K 5/1208; B60K 5/1216; F16F 15/046; F16F 7/104; F16F 7/1028; B60G 2202/25; F02B 77/13; F01P 11/02

USPC ............ 248/634, 560, 629, 636, 638, 300; 188/378–380; 267/140.11; 280/830–839; 180/68.4
See application file for complete search history.

(56) References Cited

U.S. PATENT DOCUMENTS 4,538,697 A * 9/1985 Muroi et al. .............. 180/68.4
4,662,432 A * 5/1987 Suzuki ..................... 165/41
(Continued)

FOREIGN PATENT DOCUMENTS

JP 64-330 Y2 1/1989
JP 3200451 A 9/1991
(Continued)

OTHER PUBLICATIONS

Search Report for International Patent Application No. PCT/JP2011/066901; Nov. 1, 2011.

*Primary Examiner* — Ingrid M Weinhold
(74) *Attorney, Agent, or Firm* — Barnes & Thornburg LLP (57) ABSTRACT

A supporting structure for a cooling water reserve tank for a vehicle in which a powertrain including an engine is supported on a vehicle body by a mounting bracket and a cooling water reserve tank is attached to the mounting bracket via a reserve tank bracket. The cooling water reserve tank and cooling water stored therein is formed as a weight with the reserve tank bracket being formed as an elastic body to thereby constitute a dynamic damper, and a resonant frequency of the dynamic damper substantially coincides with a frequency of vibration occurring at a time of idling operation of the engine.

6 Claims, 5 Drawing Sheets

(56) References Cited

U.S. PATENT DOCUMENTS

| | | | |
|---|---|---|---|
| 4,766,968 A * | 8/1988 | Matsunaga | 180/68.4 |
| 4,821,828 A * | 4/1989 | Schwerzler et al. | 180/68.4 |
| 5,785,140 A * | 7/1998 | Suzuki et al. | 180/68.4 |
| 6,539,913 B1 * | 4/2003 | Gardiner | 123/231 |
| 6,609,849 B2 * | 8/2003 | Kalm et al. | 403/91 |
| 7,743,862 B2 * | 6/2010 | Togawa et al. | 180/68.4 |
| 2007/0246280 A1 * | 10/2007 | Maeda et al. | 180/68.4 |
| 2011/0290607 A1 * | 12/2011 | Teknos et al. | 188/379 |

FOREIGN PATENT DOCUMENTS

| | | |
|---|---|---|
| JP | 05071580 | 3/1993 |
| JP | 06058144 | 3/1994 |
| JP | 2005082063 A | 3/2005 |

* cited by examiner

SUPPORTING STRUCTURE FOR COOLING WATER RESERVE TANK OF VEHICLE

PRIORITY CLAIM

This patent application is a U.S. National Phase of International Patent Application No. PCT/JP2011/066901, filed 26 Jul. 2011, which claims priority to Japanese Patent Application No. 2010-169221, filed 28 Jul. 2010, the disclosures of which are incorporated herein by reference in their entirety.

TECHNICAL FIELD

The present invention relates to a supporting structure for a cooling water reserve tank of a vehicle, and particularly, to a supporting structure for a cooling water reserve tank of a vehicle which aims to reduce an idle vibration transmitted from a powertrain to a vehicle body by using a cooling water reserve tank for storing engine cooling water and a reserve tank bracket.

BACKGROUND ART

In a vehicle such as an automobile or car, a powertrain formed from an engine and a transmission arranged in an engine room is elastically supported on a vehicle body by a mounting device so as to suppress vibration transmitted to the vehicle body. The mounting device is formed from a powertrain-side mounting bracket which is attached to the powertrain, a vehicle body-side mounting bracket which is attached to a side member or the like forming the vehicle body, and a bush (bushing) mount for elastically connecting the mounting bracket on the powertrain side and the mounting bracket on the vehicle body side.

Furthermore, the vehicle has auxiliary components and the like for the engine arranged in the engine room. For example, in the engine room of the vehicle, there are provided with a battery for supplying power to the engine and the auxiliary components, and a cooling water reserve tank for securing an expansion space for cooling water in relation to a rising in a temperature and for compensating for a loss of cooling water due to evaporation or the like.

As a supporting structure for a battery, there is provided a structure for attaching a battery tray on which the battery is mounted to the mounting bracket on the vehicle body side of the mounting device via a buffer (for example, Patent Document 1). Furthermore, as a supporting structure for a cooling water reserve tank, there is provided a structure for attaching a reserve tank bracket, to which the reserve tank is attached, to the mounting bracket on the vehicle body side of the mounting device (for example, Patent Document 2).

PRIOR ART DOCUMENT

Patent Document

Patent Document 1: Japanese Patent Laid-Open Publication No. 3-200451
Patent Document 2: Japanese Patent Laid-Open Publication No. 2005-82063

DESCRIPTION OF INVENTION

Problem to be Solved by Invention

Patent Document 1 discloses a structure in which vibration occurring in the vehicle body at the time of idle operation of the engine is reduced by resonance of a vibration system formed from a battery, a battery tray and a buffer. However, with such structure, the mass of the battery cannot be freely adjusted, which provided an inconvenience that the resonant frequency has to be adjusted only by the shape of the buffer.

On the other hand, Patent Document 2 discloses a structure in which a cooling water reserve tank is attached to a vehicle body-side bracket by a reserve tank bracket. However, such structure is constituted to install the cooling water reserve tank in a manner so as not to interfere with the mounting bracket on the vehicle body side, and not to reduce the vibration of the powertrain.

In consideration of the conventional techniques described above, an object of the present invention is to realize a supporting structure for a cooling water reserve tank of a vehicle which can constitute a dynamic damper with existing components and reduce vibration transmitted to the vehicle body from a powertrain, and can easily adjust a resonant frequency of the dynamic damper.

Means for Solving Problem

The present invention provides a supporting structure for a cooling water reserve tank of a vehicle in which a powertrain including an engine is supported on a vehicle body by a mounting bracket and a cooling water reserve tank is attached to the mounting bracket via a reserve tank bracket, wherein the cooling water reserve tank and cooling water stored therein is formed as a weight with the reserve tank bracket being formed as an elastic body to thereby constitute a dynamic damper, and a resonant frequency of the dynamic damper substantially coincides with a frequency of vibration occurring at a time of idling operation of the engine.

In more specific, the present invention provides a supporting structure for a cooling water reserve tank of a vehicle in which a powertrain including an engine is supported on a vehicle body by a mounting bracket and a cooling water reserve tank is attached to the mounting bracket via a reserve tank bracket, wherein the cooling water reserve tank and cooling water stored in the cooling water reserve tank are taken as a weight with a mass "m", the reserve tank bracket is formed into an elastic body having spring constant in a longitudinal direction of a vehicle is made as "k", by a plate member having an L-shape with a horizontal portion which is connected to the mounting bracket and a vertical portion which is curved so as to extend upward from the horizontal portion, and a resonant frequency $f = 1/2\,\pi\sqrt{k/m}$ of a dynamic damper formed from the weight and the elastic body substantially coincides with a frequency of vibration caused by combustion at a time of idling operation of the engine.

Effects of Invention

According to the supporting structure for a cooling water reserve tank of a vehicle of the present invention, the dynamic damper is provided with a cooling water reserve tank and cooling water as the weight and a reserve tank bracket as an elastic body, and therefore, the idle vibration of the engine that is transmitted to the vehicle body can be reduced by this dynamic damper.

Furthermore, in the supporting structure for a cooling water reserve tank of a vehicle of the present invention, the cooling water reserve tank and the cooling water stored therein are formed as the weight, and thus, the mass and a position of a center of gravity of the weight can be freely adjusted by changing a shape of the cooling water reserve tank or the amount of cooling water, and thus, a degree of freedom regarding the form of the reserve tank bracket as an elastic body can be increased.

Accordingly, the supporting structure for a cooling water reserve tank of a vehicle of the present invention can constitute a dynamic damper with existing components to thereby reduce the idle vibration transmitted to the vehicle body from the powertrain and easily adjust the resonant frequency of the dynamic damper

BEST MODE FOR EMBODYING INVENTION

The present invention reduces the vibration transmitted from a powertrain to a vehicle body and enables easy adjustment of a resonant frequency of a dynamic damper having a cooling water reserve tank and cooling water as a weight and a reserve tank bracket as an elastic body, by causing the resonant frequency of the dynamic damper to substantially coincide with the frequency of vibration occurring at the time of idle operation of the engine.

Hereinafter, an embodiment of the present invention will be described with reference to the accompanying drawings. It is to be noted that the terms indicating directions (left and right, front and back, and the like) in the following description are used herein with reference to the illustrations of the drawings or in a normal mounting state of a reserve tank.

Embodiment

In FIGS. 5 to 8, reference numeral 1 indicates a vehicle, such as an automobile or car, for example, and the vehicle 1 is provided with a powertrain 12 having a transverse engine 10 and a transmission 11 connected to a left side of the engine 10 arranged in an engine room 9. A pair of left and right side frames 2 and 3, a pair of left and right side panels 4 and 5 are arranged on left and right sides of the powertrain 12, a cross-member 6 is arranged at a front side thereof, and a dash panel 7 and a floor panel 8 are arranged at a rear side thereof.

Further, the engine 10, the transmission 11 and the powertrain 12 are arranged inside the engine room 9.

The powertrain 12 supports the engine 10 on the right side frame 2 by a right side mounting device 13, and supports the transmission 11 on the left side frame 3 by a left side mounting device 14 and on a rear side lower cross-member by a rear side mounting device at a back. It is further to be noted that the left side mounting device 14 has a target structure for supporting a cooling water reserve tank 35 described later, and thus, in the following, the left side mounting device 14 will be described.

Figure 1:
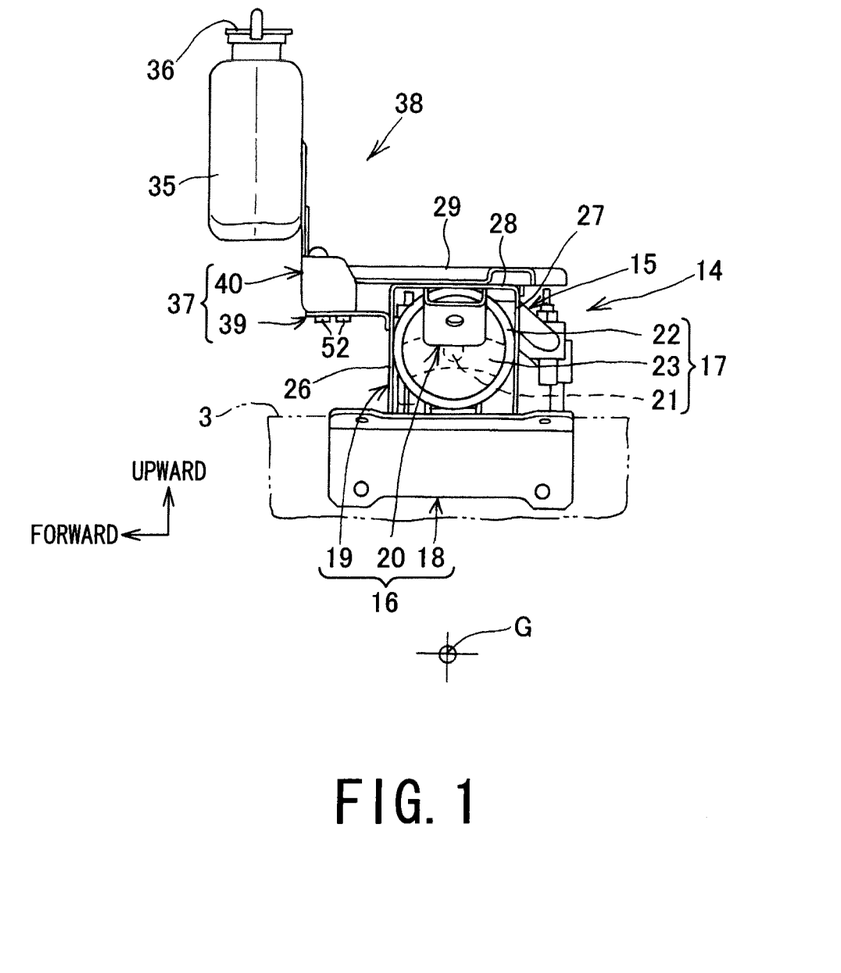
FIG. 1 is a side view of a supporting structure for a cooling water reserve tank of a vehicle according to an embodiment of the present invention.
Figure 2:
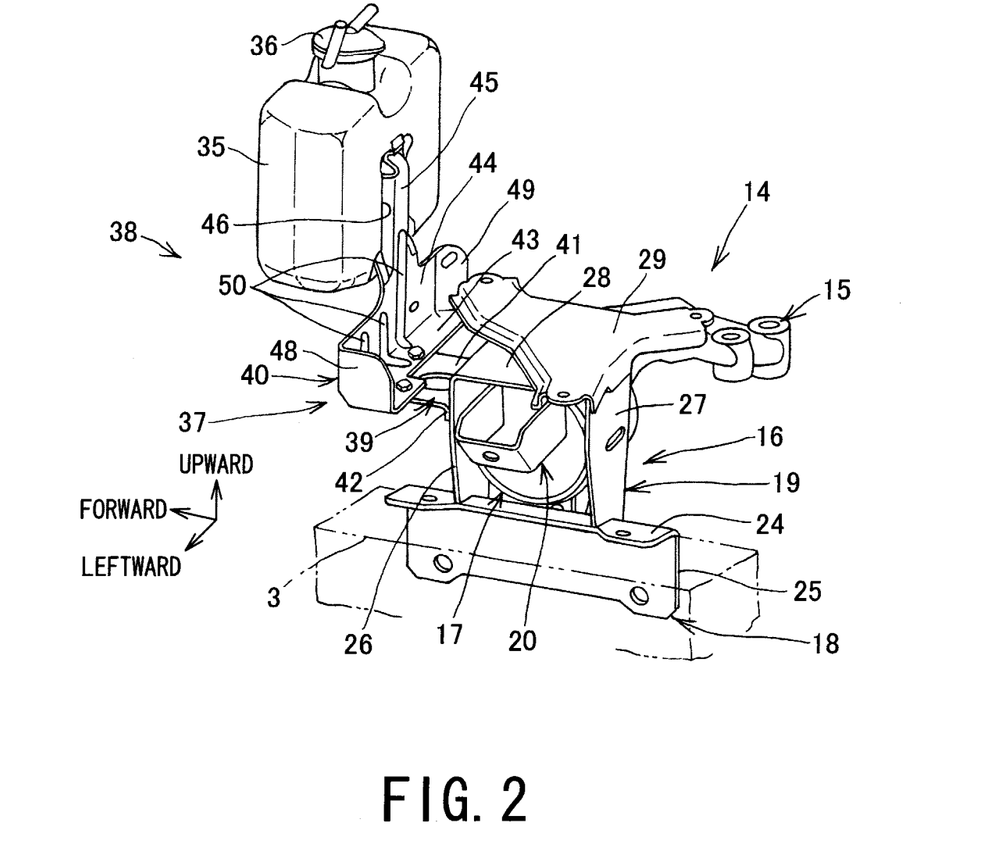
FIG. 2 is a perspective view of the supporting structure for a cooling water reserve tank of a vehicle according to the embodiment of the present invention.

As shown in FIGS. 1 and 2, the left side mounting device 14 of the powertrain 12 is arranged on a side of the left side frame 3 forming a vehicle body. The mounting device 14 is composed of a mounting bracket 15 on a powertrain side which is attached to the transmission 11 of the powertrain 12, a mounting bracket 16 on a vehicle body side which is attached to the left side frame 3 and the left side panel 5, and a bush mount 17 that elastically connects the powertrain side mounting bracket 15 and the vehicle body side mounting bracket 16.

The mounting bracket 15 on the powertrain side is integrally formed with an inner tube 21 of the bush mount 17 described later and the transmission 11, with one end fixed to the inner tube 21 and another end attached to the transmission 11. The mounting bracket 16 on the vehicle body side is composed of a first mounting bracket 18 on the vehicle body side which is attached to the side frame 3, a second mounting bracket 19 on the vehicle body side which is fixed to an outer tube 22 of the bush mount 17 described later, and a third mounting bracket 20 on the vehicle body side which is fixed to the second mounting bracket 19 on the vehicle body side and attached to the side panel 5.

The bush mount 17 includes the inner tube 21, the outer tube 22 which is arranged coaxially on an outer circumference of the inner tube 21 and to which the second mounting bracket 19 on the vehicle body side of the mounting bracket 16 on the vehicle body side is fixed, and an anti-vibration rubber 23 that connects the inner tube 21 and the outer tube 22. The bush mount 17 arranges the inner tube 21 and the outer tube 22 so that their axes extend in a left and right direction of the vehicle 1, fixes the mounting bracket 15 on the powertrain side to the inner tube 21, and fixes the second mounting bracket 19 on the vehicle body side of the mounting bracket 16 on the vehicle body side to the outer tube 22.

The first mounting bracket 18 on the vehicle body side is formed into an inverted L-shape by an upper surface portion 24 and an upright portion 25, and the upper surface portion 24 and the upright portion 25 are attached to the side frame 3.

The second mounting bracket 19 on the vehicle body side is formed into an inverted U-shape in a side view with an opening side directed downward of the vehicle 1 by a pair of vertical wall portions 26 and 27 extending in a vertical direction of the vehicle and facing each other in a longitudinal direction of the vehicle 1, and a flat upper wall portion 28 connecting upper ends of the pair of vertical wall portions 26 and 27.

The second mounting bracket 19 on the vehicle body side fixes lower ends of the pair of vertical wall portions 26 and 27 extending in the vertical direction of the vehicle to the upper surface portion 24 and the upright portion 25 of the first mounting bracket 18 on the vehicle body side by means of welding or like.

The outer tube 22 of the bush mount 17 arranged such that the axis extends in the left and right direction of the vehicle 1 is fixed by the second mounting bracket 19 on the vehicle body side at a portion inside the pair of vertical wall portions 26 and 27 and below the upper wall portion 28. In addition, the second mounting bracket 19 on the vehicle body side fixes a battery bracket 29 for attaching a battery tray on an upper side of the upper wall portion 28.

The third mounting bracket 20 on the vehicle body side is formed into a tilted U-shape in a plane view with the opening side directed rightward of the vehicle 1, and fixes an end of the opening side to the lower side of the upper wall portion 28 of the second mounting bracket 19 on the vehicle body side.

Figure 5:
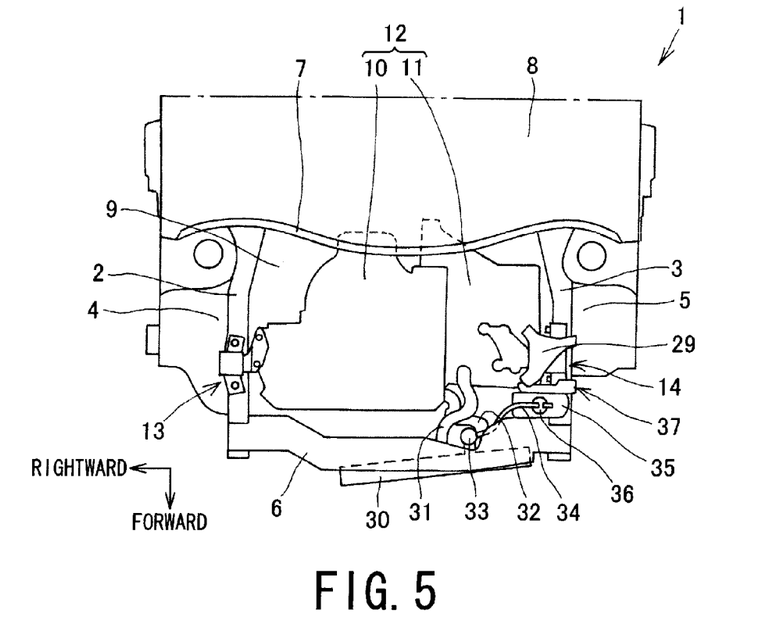
FIG. 5 is a plan view illustrating an inside of an engine room of the vehicle.
Figure 6:
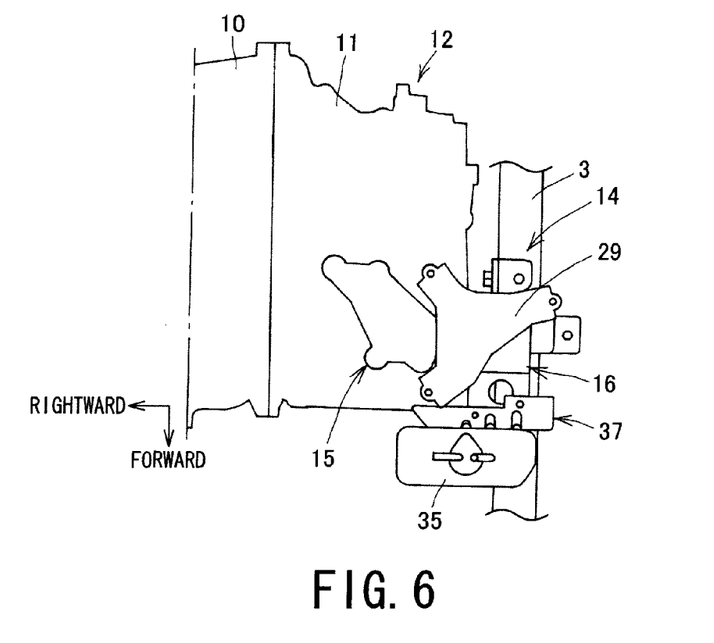
FIG. 6 is an illustration of an enlarged plan view of a mounting device portion of a power plant of the vehicle.
Figure 7:
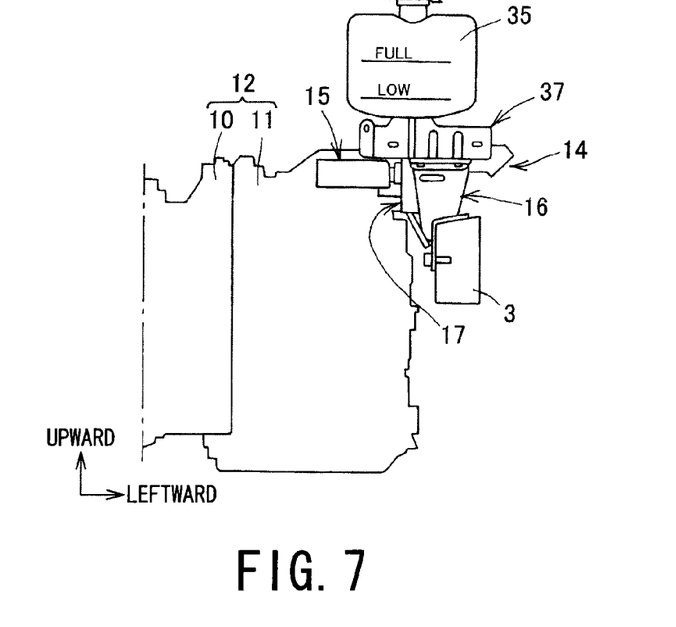
FIG. 7 is an enlarged front view of the mounting device portion of the power plant.
Figure 8:
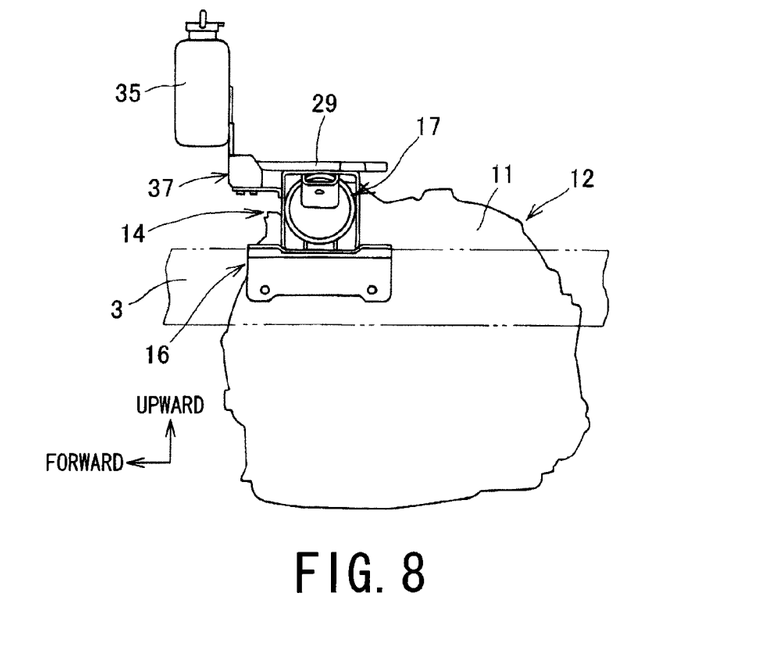
FIG. 8 is an enlarged side view of the mounting device portion of the power plant.

As shown in FIG. 5, the vehicle 1 is provided with a radiator 30 for cooling the cooling water for the engine 10, the radiator 30 being arranged in front of the engine 10 and the transmission 11 and below the cross-member 6. An inlet hose 31 and an outlet hose 32 are joined to the radiator 30 so that the inlet hose 31 introduces warmed cooling water from the engine 10 and the outlet hose 32 supplies cooled cooling water to the engine 10.

Furthermore, the radiator 30 connects one end of a reserve hose 34 to a pressure cap 33, and another end of the reserve hose 34 is connected to a tank cap 36 of the cooling water reserve tank 35. The cooling water reserve tank 35 is connected to the radiator 30 via the reserve hose 34 so as to secure an expansion space for the cooling water in relation to a rising in the temperature and compensate for the loss of cooling water due to the evaporation or the like. Furthermore, the cooling water reserve tank 35 is attached to the mounting bracket 16 on the vehicle body side of the left side mounting device 14 via a reserve tank bracket 37.

As shown in FIG. 5, the vehicle 1 is provided with the powertrain 12 composed of the engine 10 and the transmission 11 transversely arranged in the engine room 9, and the powertrain 12 is elastically supported on the vehicle body at three portions of the powertrain 12, i.e. a right end portion, a left end portion (the mounting device 13, and the mounting device 14) and a rear end portion, not shown. As shown in FIG. 1, the right and left mounting devices 13 and 14 are arranged at positions higher than a center of gravity G of the powertrain 12, and support the powertrain 12 in a hanging manner. The mounting device disposed at the rear end portion serves to restrict the movement of the powertrain 12.

As mentioned above, since the powertrain 12 is supported in a hanging manner by the mounting devices 13 and 14, both being disposed at the right and left end portions, respectively, the left and right mounting devices 13 and 14 vibrate in the longitudinal direction of the vehicle at the time of the idling operation of the engine 10.

The present invention attenuates the idling vibration occurring in the mounting bracket 16 on the vehicle body side at the time of the idling operation of the engine 10. For attaining this purpose, as shown in FIGS. 1 and 2, as a supporting structure for the cooling water reserve tank 35 for suppressing the vibration, there is arranged the mounting bracket 16 on the vehicle body side of the left side mounting device 14 at a position at which the idle vibration of the engine 10 is input in the longitudinal direction of the vehicle, and the cooling water reserve tank 35 attached to the mounting device 14 via the reserve tank bracket 37 can attain the function as a dynamic damper 38.

For example, when the engine 10 is a 4-cycle-4-cylinder engine and the engine speed at the time of idling operation is 750 rpm, a frequency of the vibration caused by combustion of the engine 10 is 25 Hz. Accordingly, a resonant frequency of the dynamic damper 38 is set to 25 Hz. The resonant frequency of the dynamic damper 38 is obtained by $f=1/2 \pi \sqrt{k/m}$. The symbol "m" is the mass of a weight, and "k" is the spring constant of an elastic body.

In the supporting structure for the cooling water reserve tank 35, the dynamic damper 38 having the cooling water reserve tank 35 including cooling water as the weight and the reserve tank bracket 37 as an elastic body is formed. Specifically, the mass "m" of the cooling water reserve tank 35 including the cooling water is set to 557 g, and at this time, the spring constant "k" of the elastic body is set to 13.7 N/mm.

The reserve tank bracket 37 is able to set the spring constant "k" to the value mentioned above (13.7 N/mm) by appropriately selecting a distance from a point of attachment of the mounting device 14 to the vehicle body side mounting bracket 16 to the center of gravity of the cooling water reserve tank 35 and a cross-sectional shape thereof.

In the following, structures of the cooling water reserve tank 35 and the reserve tank bracket 37, which are essential components, will be described.

Figure 4A:
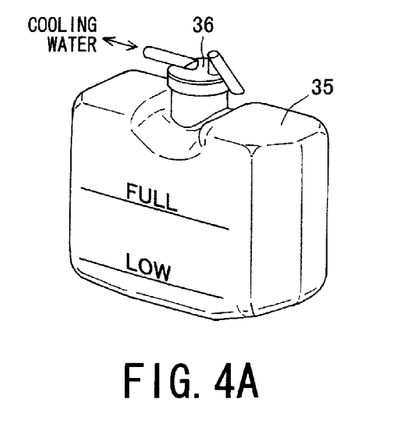
FIG. 4A is a front perspective view showing a front side of the cooling water reserve tank.
Figure 4B:
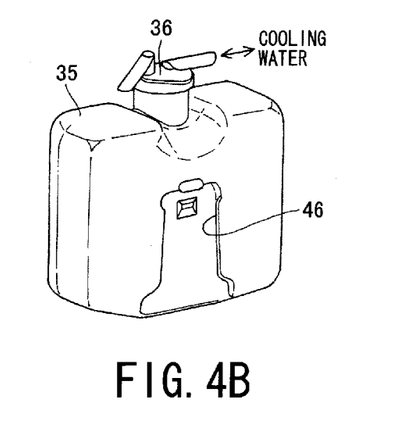
FIG. 4B is a rear perspective view showing a rear side of the cooling water reserve tank.

As shown in FIG. 4, since the cooling water reserve tank 35 functions as the weight of the dynamic damper 38, the total mass of the cooling water reserve tank 35 and the cooling water is set to a set value (for example, 557 g mentioned above).

Furthermore, in addition to the mass of the weight, the shape of the cooling water reserve tank 35 is set such that a position of the center of gravity of the cooling water reserve tank 35 is separated by a optimal distance from the mounting bracket 37 for setting the spring constant of the reserve tank bracket 37 to a set value (for example, 13.7 N/mm mentioned above).

Figure 3:
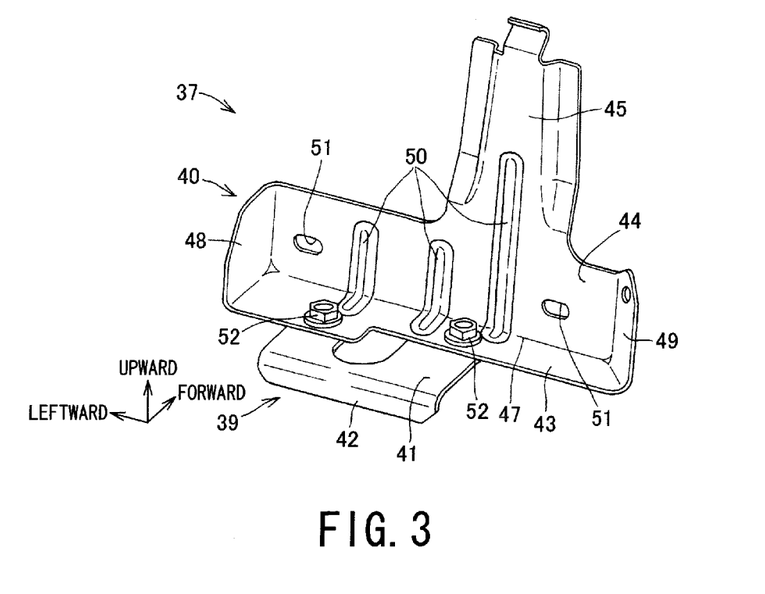
FIG. 3 is a perspective view of a reserve tank bracket of the embodiment in an enlarged scale.

As shown in FIG. 3, in order to function as the elastic body of the dynamic damper 38, the reserve tank bracket 37 is divided into a first reserve tank bracket 39 on the lower side, with respect to a horizontal surface, in the vertical direction of the vehicle and a second reserve tank bracket 40 on the upper side in the vertical direction of the vehicle.

The first reserve tank bracket 39 is formed of a plate member having a thickness thicker than the second reserve tank bracket 40 (for example, about 2.6 mm), and is formed into a tilted L-shape having a planar portion 41 and a fixed portion 42 extending downward, by a small distance, from the planar portion 41. The first reserve tank bracket 39 connects the fixed portion 42 to the vertical wall portion 26 so as to protrude toward the front of the vehicle from the vertical wall portion 26 at the front of the mounting bracket 16 on the vehicle body side. This first reserve tank bracket 39 does not function as the elastic body of the dynamic damper 38 and serves to transmit the vibration of the dynamic damper 38 to the vertical wall portion 26 of the mounting bracket 16 on the vehicle body side.

The second reserve tank bracket 40 is formed into an L-shape with a horizontal portion 43 along an upper surface of the planar portion 41 of the first reserve tank bracket 39 and a vertical portion 44 which is curved and extending upward from the horizontal portion 43, and functions as the elastic body of the dynamic damper 38. Therefore, the second reserve tank bracket 40 is formed of a plate member having a thickness thinner than the first reserve tank bracket 39 (for example, about 1.4 mm). A reserve tank attachment portion 45 extending upward is formed on the vertical portion 44. A bracket attachment portion 46 of the cooling water reserve tank 35 is attached to the reserve tank attachment portion 45.

The mounting device 14 is positioned at the position higher than the center of gravity G of the powertrain 12 in the vertical direction of the vehicle, and the vibration in the longitudinal direction of the vehicle occurs in the mounting bracket 16 on the vehicle body side by the idle operation of the engine 10. Thus, the second reserve tank bracket 40 is formed so as to provide a shape capable of being easily vibrated in the longitudinal direction of the vehicle.

Specifically, as shown in FIG. 3, both ends, in a width direction of the vehicle, of a curve portion 47 at which the horizontal portion 43 and the vertical portion 44 are connected are connected to left and right flange portions 48 and 49 extending in the longitudinal direction of the vehicle, and the rigidity in the longitudinal direction of the vehicle is made lower compared to the rigidity of the vehicle in the vertical direction and the left and right direction.

Furthermore, the second reserve tank bracket 40 forms a plurality of beads 50 extending from the horizontal portion 43 to the vertical portion 44 and the reserve tank attachment portion 45 via the curve portion 47. According to this structure, the second reserve tank bracket 40 is set so as to have the spring constant of the reserve tank bracket 37 in the longitudinal direction of the vehicle to a set value (for example, 13.7 N/mm mentioned above).

It is further to be noted that the spring constant of the reserve tank bracket 37 is also set based on, in addition to the beads 50, the flange portions 48 and 49, materials, the thickness, and shape and position of a punch-out portion (lightening portion) 51. In addition, the first reserve tank bracket 39 and the second reserve tank bracket 40 are connected by means of fixing accessory 52 such as bolts, nuts and the like.

As described above, in the supporting structure for the cooling water reserve tank 35, the dynamic damper 38 having the cooling water reserve tank 35 and the cooling water stored therein as the weight and the reserve tank bracket 37 as an elastic body is formed, and the resonant frequency of the dynamic damper 38 is made to substantially coincide with the frequency of vibration occurring at the time of idle operation of the engine 10.

Since the supporting structure for the cooling water reserve tank 35 forms the dynamic damper 38 that has the cooling water reserve tank 35 and the cooling water as the weight and the reserve tank bracket 37 as an elastic body, the idle vibration of the engine 10 transmitted to the vehicle body can be reduced by this dynamic damper 38.

Furthermore, with the supporting structure for the cooling water reserve tank 35, since the cooling water reserve tank 35 and the cooling water stored therein are taken as the weight, the mass and the position of the center of gravity of the weight can be freely adjusted by changing the shape or form of the cooling water reserve tank 35 or the amount of cooling water, and in addition, the degree of freedom regarding the form of the reserve tank bracket 37 as an elastic body can be increased.

Accordingly, with the supporting structure for the cooling water reserve tank 35, the dynamic damper 38 can be formed from existing components and can reduce the idle vibration transmitted from the powertrain 12 to the vehicle body, and also, the resonant frequency of the dynamic damper 38 can be easily adjusted.

Furthermore, according to the supporting structure for the cooling water reserve tank 35, the mounting bracket 16 on the vehicle body side of the left side mounting device 13 is arranged at a position at which the idle vibration of the engine 10 can be input in the longitudinal direction of the vehicle, the reserve tank bracket 37 is connected to the front side vertical wall portion 26 of the vehicle body side mounting bracket 16, which extends in the vertical direction of the vehicle, and the resonant frequency of the dynamic damper 38 in the longitudinal direction of the vehicle is made to substantially coincide with the frequency of vibration occurring at the time of the idling operation of the engine 10 of the powertrain 12.

Thus, the supporting structure for the cooling water reserve tank 35 can thereby more effectively attenuate the idle vibration of the powertrain 12 inputted in the longitudinal direction of the vehicle to the mounting bracket 37 on the vehicle body side.

Furthermore, according to the supporting structure for the cooling water reserve tank 35, the reserve tank bracket 37 is divided into the first reserve tank bracket 39 on the lower side, with respect to the horizontal surface, in the vertical direction of the vehicle and the second reserve tank bracket 40 on the upper side in the vertical direction of the vehicle.

In addition, the first reserve tank bracket 39 is constructed by a plate member having thickness thicker than that of the second reserve tank bracket 40 and is connected in a manner protruding from the vertical wall portion 26 of the mounting bracket 16 on the vehicle body side toward the front side of the vehicle.

The second reserve tank bracket 40 is formed into an L-shape with the horizontal portion 43 along the upper surface of the first reserve tank bracket 39 and the vertical portion which is curved and extending upward from the horizontal portion 43.

Moreover, the both ends, in the width direction of the vehicle, of the horizontal portion 43 and the vertical portion 44 are connected by the flange portions 48 and 49 extending in the longitudinal direction of the vehicle.

As described above, according to the supporting structure of the cooling water reserve tank 35, the reserve tank bracket 37 is divided into the first reserve tank bracket 39 on the lower side, with respect to the horizontal surface, in the vertical direction of the vehicle and the second reserve tank bracket 40 on the upper side in the vertical direction of the vehicle, and in addition, the first reserve tank bracket 39 is formed of a plate member having thickness thicker than that of the second reserve tank bracket 40 and is connected in a manner protruding from the vertical wall portion 26 of the vehicle body side mounting bracket 16 toward the front of the vehicle. Accordingly, the vibration of the vehicle body side mounting bracket 16 in the longitudinal direction of the vehicle can be attenuated by transmitting the vibration of the weight formed from the cooling water reserve tank 35 in the longitudinal direction of the vehicle to the vertical wall portion 26 of the mounting bracket 16 on the vehicle body side.

Furthermore, the supporting structure for the cooling water reserve tank 35 enables the second reserve tank bracket 40 to easily vibrate in the longitudinal direction of the vehicle by forming the second reserve tank bracket 40 so as to provide the L-shape with the horizontal portion 43 and the vertical portion 44, with a plate member having thickness thinner in comparison with the first reserve tank bracket 38.

Moreover, according to the supporting structure for the cooling water reserve tank 35, since both ends, in the width direction of the vehicle, of the horizontal portion 43 and the vertical portion 44 of the second reserve tank bracket 40 are connected by the flange portions 48 and 49 extending in the longitudinal direction of the vehicle, the resonant frequency of the dynamic damper 38 can be changed in accordance with the shapes of the flange portions 48 and 49, and the resonant frequency of the dynamic damper 38 can be thereby easily adjusted.

INDUSTRIAL APPLICABILITY

The present invention enables constitution of a dynamic damper from existing components and reduction of the idle vibration transmitted from the powertrain to the vehicle body, and in addition, easy adjustment of the resonant frequency of the dynamic damper, and the same effects can be obtained by attaching the dynamic damper at a portion at which where it is necessary to be located, without being limited to the mounting device which is a suspension system of the engine, and by attaching an auxiliary tank of an auxiliary tank starter system of a flexible fuel vehicle (FFV) in the same manner, the same effect as the dynamic damper can be obtained.

REFERENCE NUMERAL

1 - - - vehicle
2 - - - right side frame

3 - - - left side frame
9 - - - engine room
10 - - - engine
11 - - - transmission
12 - - - powertrain
13 - - - right side mounting device (mounting device on right)
14 - - - left side mounting device (mounting device on left)
15 - - - powertrain side mounting bracket (mounting bracket on powertrain side)
16 - - - vehicle body side mounting bracket (mounting bracket on vehicle body side)
17 - - - bush mount
18 - - - first vehicle body side mounting bracket
19 - - - second vehicle body side mounting bracket
20 - - - third vehicle body side mounting bracket
26 - - - front side vertical wall portion
27 - - - rear side vertical wall portion
29 - - - battery bracket
30 - - - radiator
35 - - - cooling water reserve tank
37 - - - reserve tank bracket
38 - - - dynamic damper
39 - - - first reserve tank bracket
40 - - - second reserve tank bracket
43 - - - horizontal portion
44 - - - vertical portion
45 - - - reserve tank mount portion
46 - - - bracket mounting portion
47 - - - bent (curved) portion
48 - - - right flanged portion
49 - - - left flanged portion

The invention claimed is:

1. A supporting structure for a cooling water reserve tank and a powertrain of a vehicle, the powertrain comprising a transverse engine, the structure comprising:
    a reserve tank bracket attached to both the cooling water reserve tank and a vehicle body mounting bracket,
    a powertrain side mounting bracket attached to the powertrain of the vehicle,
    a bush mount including an inner tube and an outer tube arranged coaxially having an axis extending in a transverse direction of the vehicle body which elastically couples the powertrain to the vehicle body in a hanging manner, wherein the inner tube is fixed to the powertrain side mounting bracket and the outer tube is fixed to the vehicle body side mounting bracket,
    wherein the reserve tank bracket is formed as an elastic body and a combination of the elastic body and a combined mass of the cooling water reserve tank and cooling water stored therein constitute a dynamic damper, and
    wherein the reserve tank bracket is connected to the vehicle body mounting bracket and configured to protrude in a forward direction of the vehicle body further than a vertical wall portion of the vehicle body mounting bracket, and the cooling water reserve tank is configured to protrude further forward than the transverse engine.

2. The supporting structure of claim 1, wherein the vehicle body mounting bracket is arranged at a position such that idle vibration of the engine is applied in a longitudinal direction of the vehicle, the reserve tank bracket is connected to the vertical wall portion of the vehicle body mounting bracket which extends in a vertical direction of the vehicle, and a resonant frequency of the dynamic damper in the longitudinal direction of the vehicle substantially coincides with a frequency of vibration occurring during idling operation of the engine of the powertrain to dampen the idle vibration.

3. The supporting structure claim 2, wherein the reserve tank bracket is divided into a first reserve tank bracket and a second reserve tank bracket,
    wherein the first reserve tank bracket is formed of a plate member having a thickness thicker than that of the second reserve tank bracket and the first reserve tank bracket is connected to the vehicle body mounting bracket so as to protrude from the vertical wall portion of the vehicle body mounting bracket toward a front side of the vehicle,
    wherein the second reserve tank bracket is formed into an L-shape having a horizontal portion along an upper surface of the first reserve tank bracket and a vertical portion which is curved so as to extend upward from the horizontal portion, and
    wherein first sides of the horizontal portion and the vertical portion of the second reserve tank are connected by a first flange portion extending in a longitudinal direction of the vehicle, and wherein second sides of the horizontal portion and the vertical portion of the second reserve tank opposing the first sides in a width direction of the vehicle are connected by a second flange portion extending in a longitudinal direction of the vehicle.

4. The structure of claim 1, wherein a resonant frequency of the dynamic damper substantial coincides with a frequency of vibration during idling operation of the engine to dampen the vibration.

5. A supporting structure for a cooling water reserve tank of a vehicle in which a powertrain including a transverse engine is supported on a vehicle body by a powertrain side mounting bracket that is attached to the powertrain and coupled to a vehicle body mounting bracket, and a cooling water reserve tank is attached to the vehicle body mounting bracket via a reserve tank bracket,
    wherein the reserve tank bracket is formed as an elastic material body having a spring constant k in a longitudinal direction of the vehicle,
    wherein the reserve tank bracket includes a plate member having an L-shape with a horizontal portion which is connected to the vehicle body mounting bracket and a vertical portion which is curved so as to extend upward from the horizontal portion,
    wherein a combination of the cooling water reserve tank and cooling water stored therein has a mass m,
    wherein a combination of the cooling water reserve tank and cooling water stored therein and the reserve tank bracket formed as an elastic body forms a dynamic damper, and
    wherein the reserve tank bracket is connected to the vehicle body mounting bracket configured to protrude in a forward direction of the vehicle body further than a vertical wall portion of the vehicle body mounting bracket, and the cooling water reserve tank is configured to protrude further forward than the transverse engine,
    and a bush mount including an inner tube and an outer tube arranged coaxially having an axis extending in a transverse direction of the vehicle body which elastically couples the powertrain to the vehicle body in a hanging manner, wherein the inner tube is fixed to the powertrain side mounting bracket and the outer tube is fixed to the vehicle body side mounting bracket.

6. The structure of claim 5, wherein a resonant frequency $f=1/2\,\pi\sqrt{k/m}$ of the dynamic damper substantial coincides with a frequency of vibration caused by combustion during idling operation of the engine to dampen the vibration.

* * * * *